United States Patent [19]

Li

[11] Patent Number: 5,775,141
[45] Date of Patent: Jul. 7, 1998

[54] LOCK FOR HAND BRAKES

[76] Inventor: Chi-Yuan Li, No.740-7, Chung-Cheng Road, Hsin-Chuang City, Taipei, Taiwan

[21] Appl. No.: 815,509

[22] Filed: Mar. 12, 1997

[51] Int. Cl.$^6$ .................................................. B60R 25/00
[52] U.S. Cl. ........................... 70/237; 70/202; 70/247
[58] Field of Search ............... 70/237, 238, 245–247, 70/201–203, 211, 212, 168, 181, 258, DIG. 58; 292/DIG. 2

[56] References Cited

U.S. PATENT DOCUMENTS

| | | | |
|---|---|---|---|
| 1,791,807 | 2/1931 | Doane | 70/247 X |
| 3,348,391 | 10/1967 | Barnwell | 70/211 |
| 3,583,184 | 6/1971 | Papale | 70/247 X |
| 4,159,015 | 6/1979 | Gotto et al. | 70/237 X |
| 4,858,451 | 8/1989 | Balina et al. | 70/202 |
| 5,134,764 | 8/1992 | Taylor | 70/237 X |
| 5,291,764 | 3/1994 | Chang | 70/237 X |
| 5,404,736 | 4/1995 | Lugo | 70/DIG. 58 X |
| 5,490,403 | 2/1996 | Bianco, Sr. | 70/247 X |
| 5,561,996 | 10/1996 | Chang | 70/247 |
| 5,596,894 | 1/1997 | Lee | 70/247 X |

FOREIGN PATENT DOCUMENTS 3816606  11/1989  Germany ................................. 70/202

*Primary Examiner*—Suzanne Dino Barrett
*Attorney, Agent, or Firm*—Bacon & Thomas

[57] ABSTRACT

A lock affixed to conventional hand brake structure, and by which, when the lock is unlocked, the hand brake can keep retain its normal functions. When the lock is locked, the hand brake can only be pulled up and cannot be released by pressing down a push button, thus locking is assured. Such structure is has the function of theft-proofing with convenience of use, also has the practicality and improveness in preventing from towing a vehicle away by thieves.

3 Claims, 5 Drawing Sheets

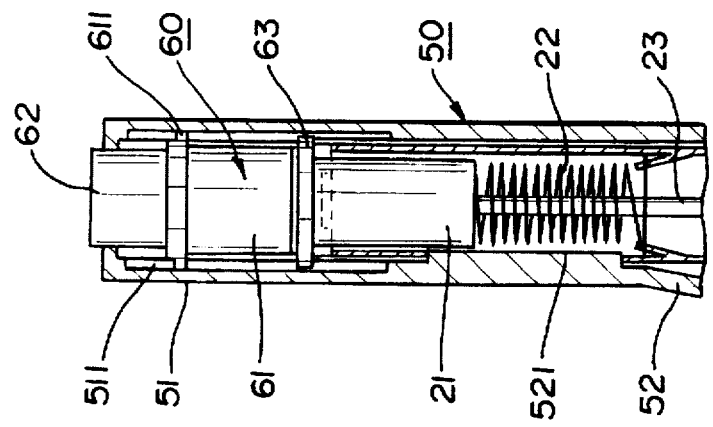
FIG. 4A
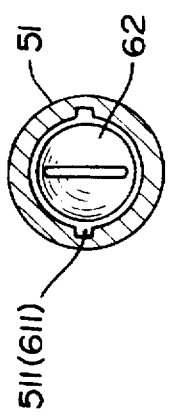
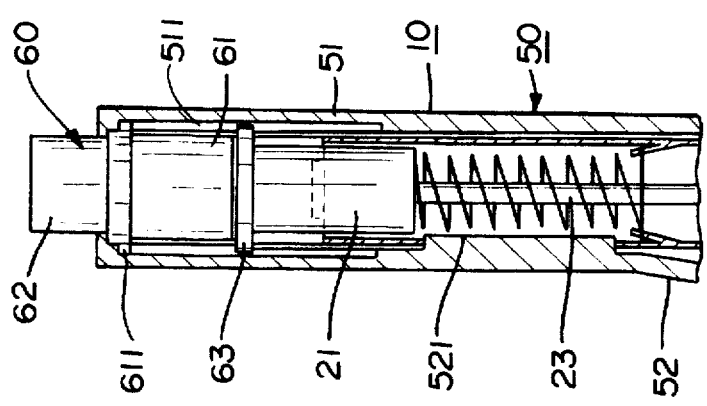
FIG. 4B
FIG. 4C

LOCK FOR HAND BRAKES

BACKGROUND OF THE INVENTION

1. Field of the Invention

The present invention is related to a lock for hand brakes, which lock is fitted in a hand brake at the top thereof, and by which a push button can be pressed down to release the hand brake when the lock is not locked. When the hand is locked, the push button cannot be pressed down, therefore, car theft can be prevented.

2. Description of the Prior Art

Theft-proof locks for cars are various and include electronic theft-proof locks, steering wheel locks (stick shaped locks), shift lever locks etc.. In the recent years, theftproof locks for cars have been developed to a state wherein the locks can be mounted directly on the shafts of the shift levers. By locking the push button on a shift lever, the shift lever is unable to be shifted. In this way, an object of locking can be achieved, and convenience of use and space saving can be effected.

In selling theft-proof locks, the inventor of the present invention found that any car lock could not effectively put an end to theft, this was because a thief can tow a car directly after breaking into the car and releasing the hand brake therein. Electronic theft-proof locks and steering wheel locks cannot protect a car effectively. Although shift lever locks and the above mentioned locks for preventing gear shifting can lock a shift lever in the parking position to provide slight braking function, they still cannot prevent towing by thieves. Hence the best way to prevent a car from being towed by thieves is to lock a hand brake too.

SUMMARY OF THE INVENTION

In view of this, the inventor of the present invention provides a lock for hand brakes based on his professional experience of years in manufacturing and selling various accessories for cars and after continuous study and improving, for eliminating chances for a thief in stealing a car.

Particularly, the lock for hand brakes of the present invention is comprised of an external sleeve and a lock head member. The external sleeve is in a shape of tube and is slipped over a hand brake, and a receiving portion is provided therein and exposed out of the top of the push button of the hand brake. Vertical and horizontal slots are provided internally at two sides thereof and cross with each other. A fixing portion is provided at the lower section thereof and can be fixed on the bottom of the hand brake.

The lock head member is received in the receiving portion of the external sleeve, and is located on the top of the push button of the hand brake. It is comprised of a lock housing, a lock core and a lock plate. A limiting flange is provided on the top edge of the lock head member, so that the lock head member is moved up and down along the vertical slots. The lock core is received in the lock housing, and of which the top is exposed to the space above the lock housing. When it is unlocked and is pressed, the whole lock head member is moved down to press the push button of the hand brake. The lock plate is connected to the bottom end of the lock core and can be rotated. A pair of lugs provided appositively on the periphery thereof can be engaged into the horizontal slots or moved out of them. When the lock core is locked and the lugs of the lock plate are engaged into the horizontal slots, the lock core is unable to be pressed down thereby preventing movement of the push button of the hand brake, so that the object of locking is obtained.

The main object of the present invention is to provide a lock for a hand brake, wherein, the push button of the hand brake can be locked and unable to be pressed down, so that a car can be kept in a braking state when it is parked, thus preventing stealing by towing of the car and a theft-proof function can thereby be provided.

The second object of the present invention is to provide a lock for a hand brake, which lock can be conveniently mounted. The above mentioned external sleeve can take the place of the housing of the shaft of a hand brake. A fixing portion provided at the lower section thereof is provided internally with a vertical protruding strip which can be engaged into a slit provided on the housing of the shaft of the hand brake. The fixing portion is provided with a clamping slit which is provided with a pair of protruding clamping strips at the two lateral sides thereof, the distance between the two clamping strips can be reduced by turning a screw, so that the width of the clamping slit can be narrowed, and thereby the external sleeve can tightly clamp the housing of the shaft of a hand brake. Assembling of the lock therefore is fast and convenient.

Another object of the present invention is to provide a lock for a hand brake, wherein, the external sleeve is prying-proof. The external sleeve is provided at the location corresponding to that of the bending portion of the shaft of a hand brake with an impediment member which can prevent the external sleeve from loosening by upward knocking or prying with an undue external force, thereby, dismantling by prying can be prevented.

Further, the bottom end of the shaft of the hand brake is bent into a plate like seat, and the external sleeve covers only the bent portion, so that when the external sleeve is knocked downward with a strong force, it will not be moved down. If the shaft of a hand brake is knocked on the back thereof, the hooking sheet thereof will not be released.

The present invention will be apparent in its practical structure after reading the detailed description of the preferred embodiment thereof in reference to the accompanying drawings.

BRIEF DESCRIPTION OF THE DRAWINGS

In the drawings:

FIG. 4A is a top view of the lock core of the present invention;

FIGS. 4B and 4C are cross-sectional views showing the action of the lock core of the present invention;

DETAILED DESCRIPTION OF THE PREFERRED EMBODIMENT

Figure 1:
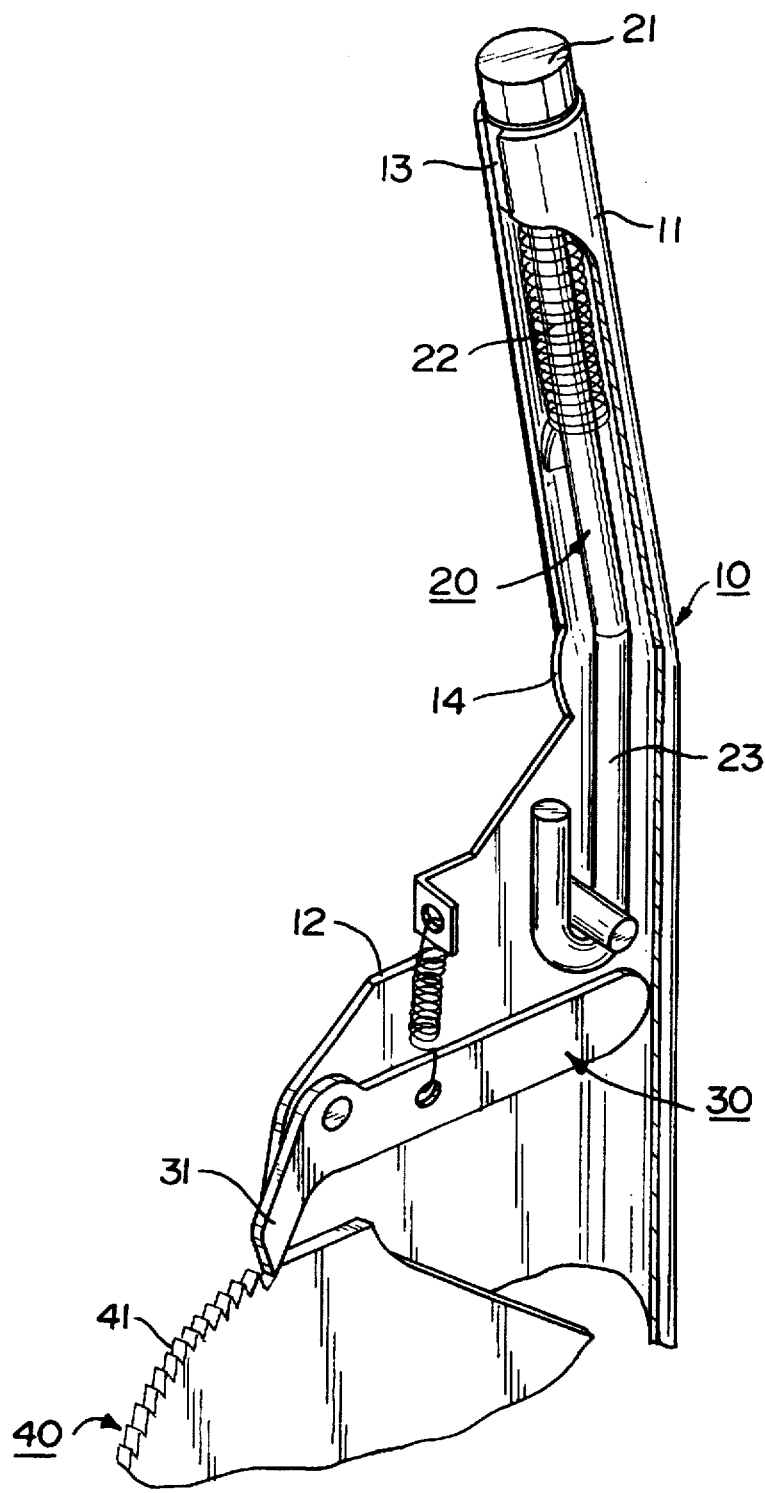
FIG. 1 is a perspective view of a conventional hand brake structure.

Referring to the structure of the shaft of the hand brake shown in FIG. 1, the structure is enveloped in a conventional housing, and is comprised of a shaft of the hand brake 10, a linkage 20, a hooking pawl 30 and a ratchet 40.

The shaft of the hand brake 10 is formed by bending an iron sheet, the top of which is a round hollow tube 11. The lower end portion thereof is a flat shaft seat 12 having therein a receiving space. A slit 13 is formed by the lateral sides thereof extending from the round hollow tube 11 through the bending portion 14 to the shaft seat 12.

The linkage 20 is provided in the shaft of the hand brake 10. An upper push button 21 is exposed above the top end thereof, biased by a spring 22 provided in the round hollow tube 11. A link 23 is connected to the bottom end of the push button 21, and extends through the round hollow tube 11 into the shaft seat 12.

The hooking pawl 30 is provided within the shaft seat 12 and beneath the link 23, having an engaging hook 31 extending outwardly.

The ratchet 40 is provided fixedly at the bottom of the shaft and is provided with a series of saw teeth 41 on the top thereof. The engaging hook 31 engages in a root of one of the teeth 41.

When the shaft of the hand brake 10 is pivotally moved upwardly, the engaging hook 31 of the hooking pawl 30 is moved over the teeth 41 of the ratchet 40. When the shaft 10 is released, the engaging hook 31 is engaged in one root of the teeth 41 and cannot be moved. The brake cable is therefore pulled tight.

When the push button 21 of the linkage 20 is pressed down, the link 23 is moved down to pivot the hooking pawl 30 to lift up the engaging hook 31 free from engagement with the teeth 41, and the shaft of the hand brake 10 can thereby be pivotally moved back to its lower position.

It can be seen that when releasing of the shaft of a conventional hand brake structure, it is necessary to press down the link 23 by means of the push button 21 to lift up the engaging hook 31 of the hooking pawl 30. Hence, as long as the push button 21 is fixed, the engaging hook 31 is unable to be moved, and after the hand brake is pulled up, it cannot be put down. Thereby, a thief will be unable to drive away or tow away the car.

The present invention comprises a lock structure which can be attached to the above stated conventional hand brake structure, and by which, when the lock structure is unlocked, the hand brake can keep the functions of pulling and releasing. When it is locked, the hand brake can only be pulled up, and cannot be put down by pressing down the push button 21, thus locking is assured.

Figure 2:
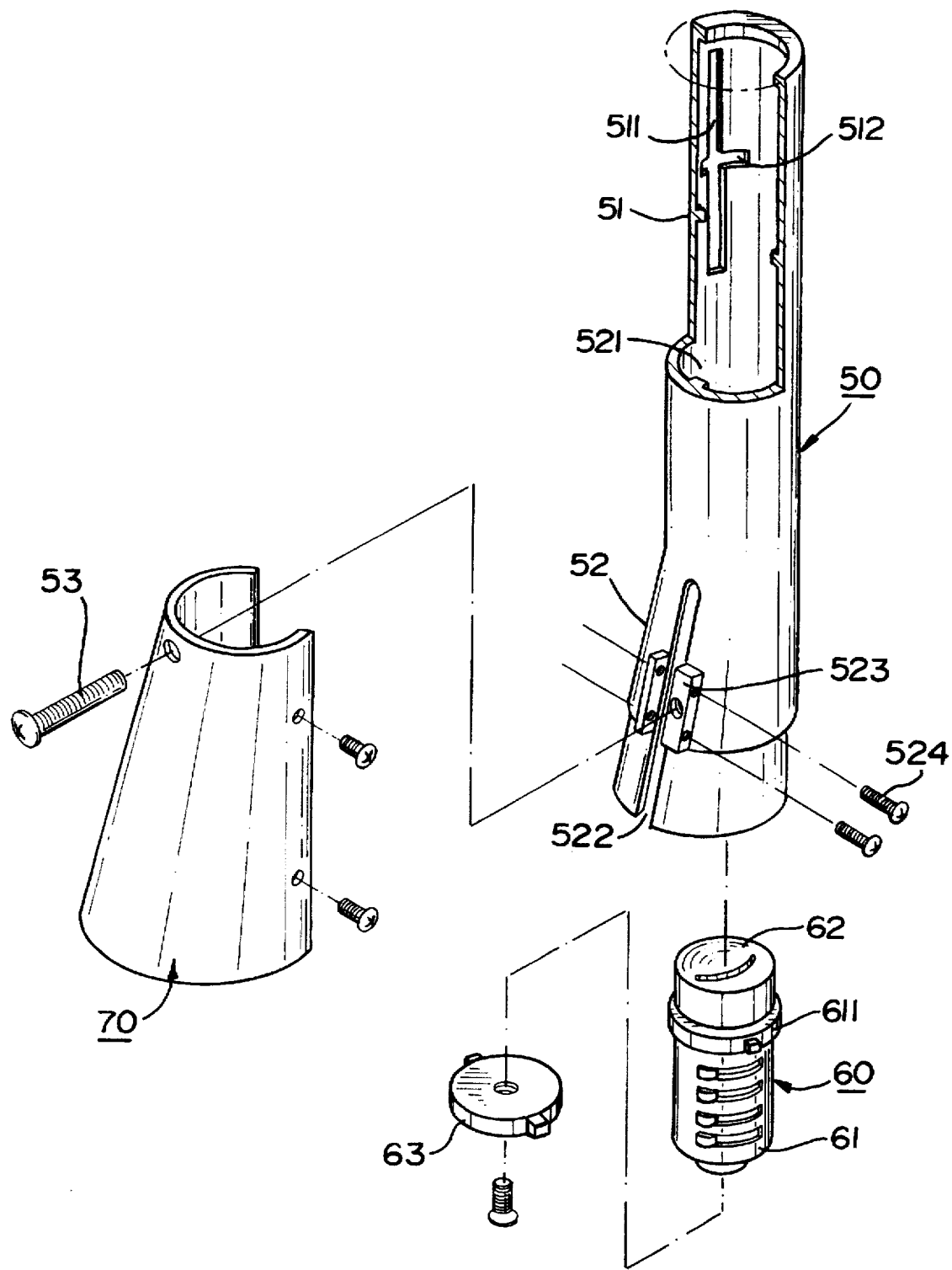
FIG. 2 is an exploded perspective view of the structure of the present invention.
Figure 3:
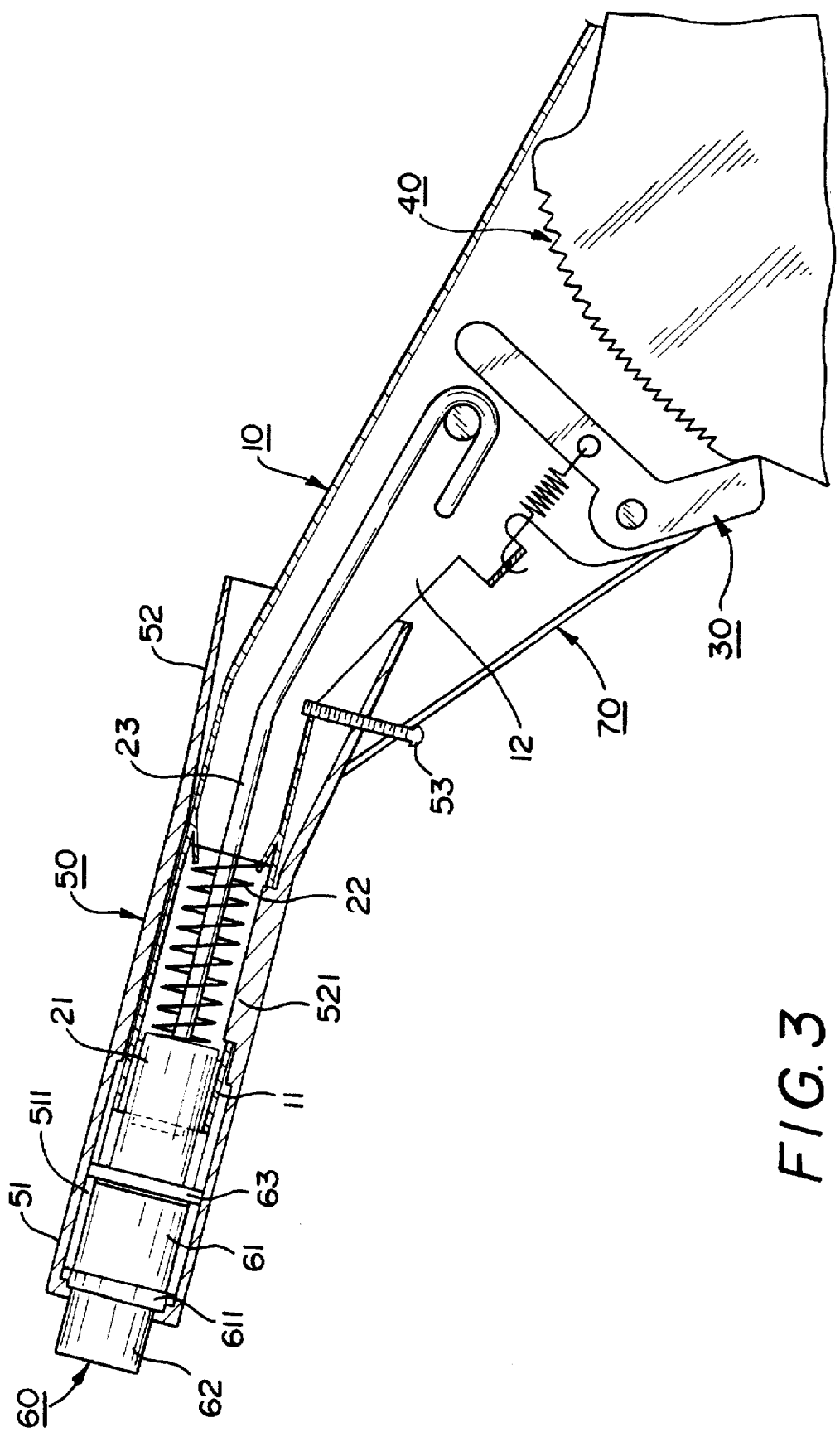
FIG. 3 is a cross-sectional view of the present invention.

As illustrated in FIGS. 2 and 3, the hand brake lock of the present invention is comprised of an external sleeve 50 and a lock head member 60.

The external sleeve 50 is slipped over the hand brake 10 and is in conformity to the shape of the latter (FIG. 1). The top section thereof is a receiving portion 51 which is exposed to the top of the hand brake 10. Both sides of the internal walls thereof are provided each with a vertical slot 511 and a horizontal slot 512 which crosses with the vertical slot 511 at the middle thereof. The bottom of the external sleeve 50 extends down to the upper surface of the shaft seat 12 of the hand brake 10 as a fixing portion 52 for fixing the external sleeve 50.

Figure 5B:
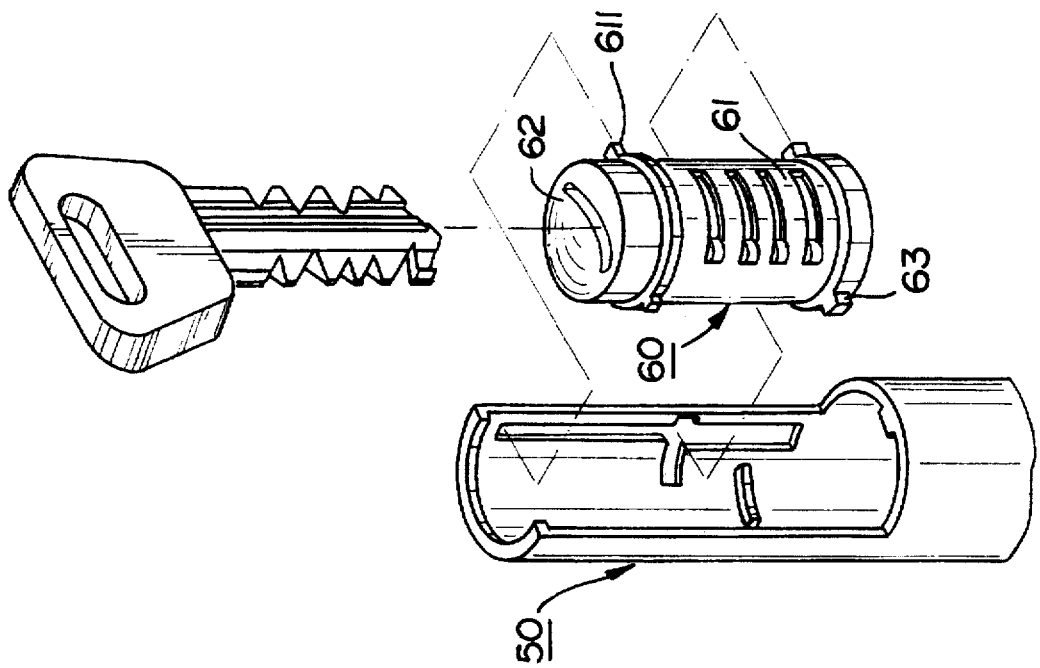
FIGS. 5A and 5B are schematic views showing the action of rotation of the lock core of the present invention.
Figure 5A:
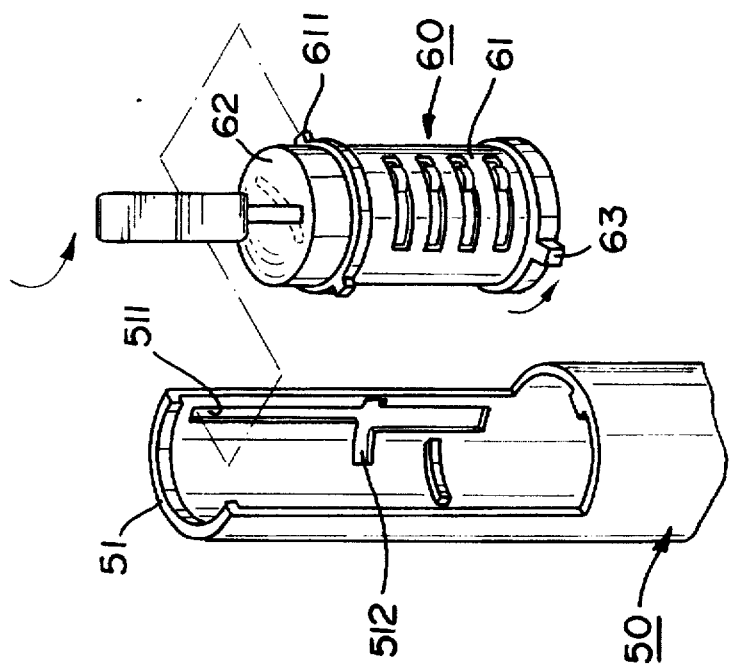

The lock head member 60 is placed in at the upper section of the receiving over portion 51 on the top of the external sleeve 50, i.e., on top of the push button 21 of the hand brake 10 (FIG. 3), and is further comprised of a lock housing 61, a lock core 62 and a lock plate 63. A limiting flange 611 protrudes from the top edge of the lock housing 61 and is engageable into, and movable upwardly and downwardly in the upper section of the vertical slots 511, so that the lock head member 60 is movable up and down along the vertical slots 511 (FIGS. 4A, 4B). The lock core 62 is received in the lock housing 61, such that the top extends above the lock housing 61. When it is unlocked and is pressed, the whole lock head member 60 can be moved up and down, and can press the push button 21 of the hand brake 10 to unbrace the hand brake 10; when the lock core 62 is locked while the lock housing 61 is limited by the vertical slots 511, the lock core 62 is rotatable in relation to the lock housing 61 (FIG. 5). The lock plate 63 is connected with the bottom of the lock core 62 and is located at the junction of the vertical slots 511 and the horizontal slots 512 (FIG. 3). When the lock core 62 is rotated with a key during unlocking or locking (FIG. 5), the lock plate 3 is rotated therewith and is moved in the horizontal slots 512. When the lock core 62 is not locked, pressing will cause the lock plate 63 to move up and down in the lower section of the vertical slots 511 (FIG. 4).

By the above stated construction, when the lock core 62 exposed from the top of the lock housing 61 (FIG. 4) is pressed, the lock head member 60 can be moved down to press the push button 21. If the hand brake 10 has been pulled up now, the hooking pawl 30 can be disengaged from the guide sheet 40 now via movement of the linkage 20 (FIG. 1). Thus the hand brake can be released. When the lock core 62 is released, the hand brake 10 will restore its function. The lock head member 60 can be pushed up by the push button 21, therefore, the lock head member 60 recovers its original state. At this time, if a user pulls up the hand brake 10 for locking a key is be inserted into the lock core 62 to rotate the lock core (FIG. 5). The lock plate 63 is rotated therewith to be engaged in the horizontal slots 512. The lock core 62 then is prevented from moving down by engagement of the lock plate 63 in the horizontal slots 512. Hence the push button 21 cannot be pressed, and the hand brake 10 cannot be released. In this way, a locking function is achieved.

Referring to FIG. 2, the above stated fixing portion 52 on the bottom of the external sleeve 50 is fixed on the upper surface of the shaft seat 12 of the hand brake 10 (FIG. 3). A vertical protruding strip 521 is provided to engage a slit 13 provided on the hand brake 10 (FIG. 1), then a clamping slit 522 is provided at a suitable position on the fixing portion 52, and a pair of protruding clamping strips 523 are provided at the two lateral sides of the clamping slit 522. Clamping strips 523 are tightly clamped with screws 524 to be close to each other to narrow the width of the clamping-slit 522, and thereby affix portion 52 on the shaft seat 12. Assembling of the lock therefore is convenient.

As shown in FIG. 1, due to the slit 13 provided on the hand brake 10, a thief may attempt to press the hooking pawl 30 by extending a long strip into the slit 13 when he cannot press the hooking pawl 30 via the linkage 20. Therefore, a guard plate 70 is fixed to cover the shaft seat 12 (FIG. 2 and 3) to protect the hooking pawl 30 from pressing by an external force.

Also as shown in FIG. 2 and 3, because the external sleeve 50 is fixed on the hand brake 10 and receives the lock head member 60, if an undue external force is exerted to pry or knock off the external sleeve 50, the whole lock set will be null. To prevent prying, an impediment member 53 extends through the external sleeve 50 and one of the protruding clamping strips 523 to be fixed on the shaft of the hand brake 10. Thereby, the external sleeve 50 can be prevented from loosening by knocking and prying.

Having now particularly described and ascertained the technical structure of my invention with practicability and in what manner the same is to be performed, what i claim as new and desire to be secured by letters patent of the united states is set forth in the appended claims:

I claim:

1. A lock for a hand brake of a vehicle, the hand brake having a hand brake shaft with a push button protruding from an end of the hand brake shaft, the lock comprising:

a) an external tubular sleeve having a receiving portion and a fixing portion with a clamping slot to facilitate clamping the external tubular sleeve to the hand brake such that the hand brake shaft and the push button are located within the receiving portion, the receiving portion of the external tubular sleeve having an inner surface in which are located an axial slot and a transverse slot, the transverse slot crossing the axial slot;

b) a lock head member having a lock housing located in an end of the external tubular sleeve, the lock housing having a limiting flange engaging the axial slot, a lock core extending from the lock housing so as to protrude from the external tubular sleeve, the lock core being rotatable between locked and unlocked positions, a lock plate rotatable with the lock core, the lock plate having a lock flange located such that, when the lock core is in the unlocked position, the lock flange engages the axial slot enabling axial movement of the lock core so as to push the push button of the hand brake, and when the lock core is in the locked position, the lock flange engages the transverse slot so as to prohibit axial movement of the lock core and pushing of the push button of the hand brake; and, c) a guard plate covering at least a part of the fixing portion of the external tubular sleeve.

2. The lock of claim 1 wherein the hand brake shaft has an axially extending slit and further comprising a protruding strip extending from the inner surface of the external tubular sleeve so as to engage the axial slit in the hand brake shaft.

3. The lock of claim 1 further comprising an impediment member connected to the guard plate and the fixing portion of the external tubular sleeve.

* * * * *